United States Patent [19]

Cabeza

[11] 4,267,742
[45] May 19, 1981

[54] SINGLE LEVER CONTROL MECHANISM FOR BICYCLE FRONT AND REAR DERAILLEURS

[76] Inventor: Maximino R. Cabeza, Calle Central 709, Miramar, Santurce, P.R. 00907

[21] Appl. No.: 963,099

[22] Filed: Nov. 22, 1978

[51] Int. Cl.³ .............................................. G05G 9/02
[52] U.S. Cl. ............................... 74/471 XY; 74/501 R
[58] Field of Search .......... 74/471 R, 471 XY, 473 R, 74/473 P, 487, 489, 501 R

[56] References Cited

U.S. PATENT DOCUMENTS

| 3,049,023 | 8/1962 | McCordic | 74/473 X |
| 3,808,907 | 5/1974 | Yamaguchi | 74/471 XY |
| 3,987,878 | 10/1976 | Hansen | 74/471 XY Y |
| 4,055,093 | 10/1977 | Ross | 74/501 R |

FOREIGN PATENT DOCUMENTS 1121909  5/1956  France ................................. 74/489

*Primary Examiner*—Kenneth Downey
*Attorney, Agent, or Firm*—Scrivener, Clarke, Scrivener and Johnson

[57] ABSTRACT

The invention relates to a control mechanism for multi-speed bicycles in which operation of both the front and rear derailleurs is performed by a single lever.

5 Claims, 15 Drawing Figures

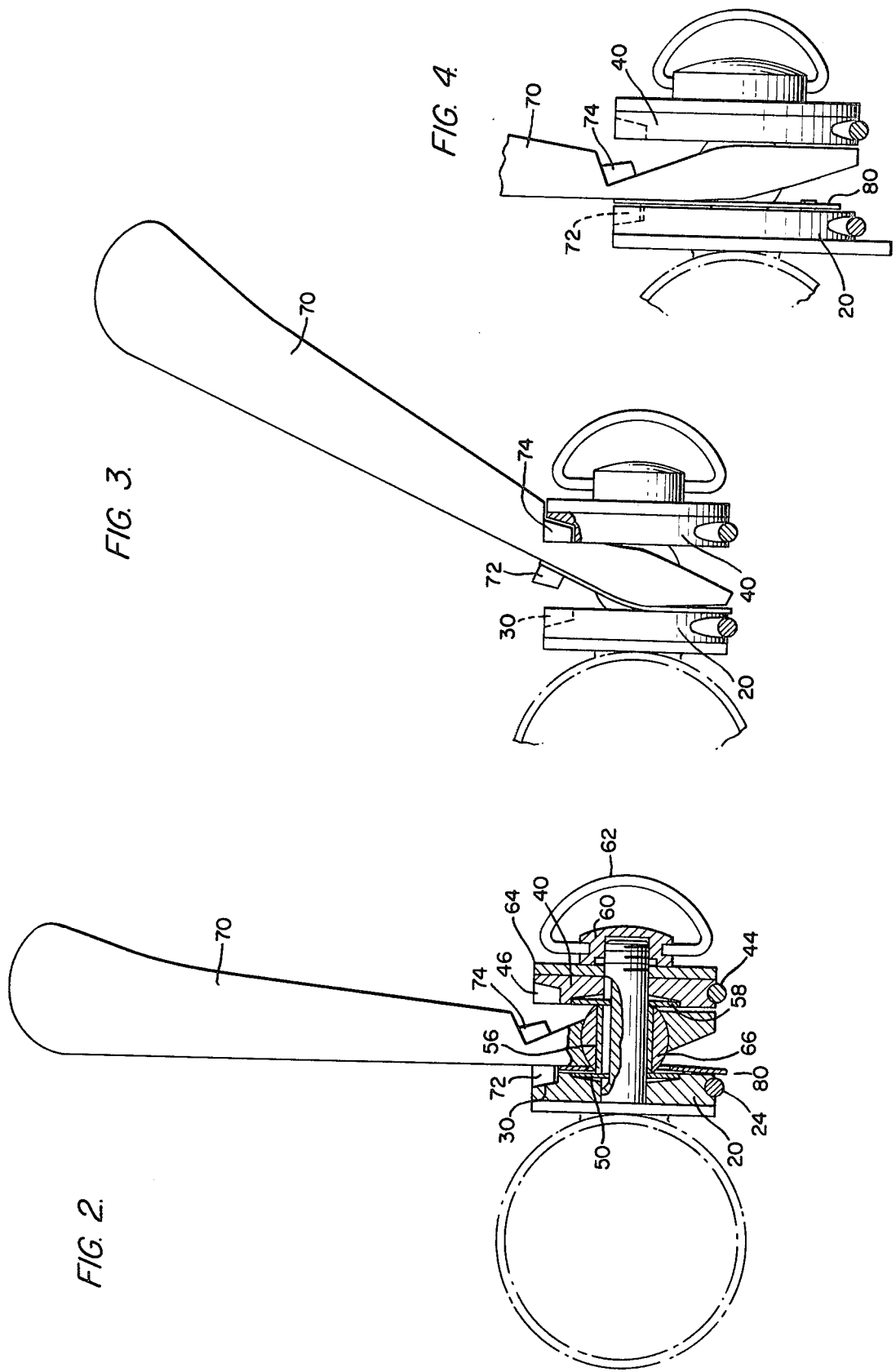

SINGLE LEVER CONTROL MECHANISM FOR BICYCLE FRONT AND REAR DERAILLEURS

SUMMARY OF THE INVENTION

A mechanism for effecting operation of both the gear shift and the central shifter of a multi-speed bicycle is mounted on the bicycle frame and has two disks which are mounted for separate rotational movement through limited arcs and which have facing recesses, and to which the operating cables leading to the gear shift and central shift are connected. A shift lever is mounted between the disks for limited fore-and-aft movement and for movement toward and away from each of the disks and has on each side a tooth which is positioned and shaped to be received within one or the other of the disk recesses upon sidewise shifting of the lever, after which the lever is shifted fore-and-aft to operate the gear shift or the central shift.

BRIEF DESCRIPTION OF THE DRAWINGS

FIG. 2 shows the entire assembly of parts of the control mechanism for the gear shift and central shifter with the single lever according to the present invention in gear shift position;

FIG. 3 is a view similar to FIG. 2 in which the lever is in the position of operating the cable-carrying disk of the central shifter;

FIG. 4 is a view similar to FIG. 2 showing a second embodiment of the invention;

BACKGROUND AND OBJECT OF THE INVENTION

Racing bicycles have a set of pinions of various diameters which permit the rider to use the one most suited to the features of terrain, the range of possibilities being further augmented by the provision of a double or triple plate replacing the standard single plate which is solid with the pedal shaft or connecting rod. By these means the cyclist is able to control the gear shift, and also the double or triple plate by a central shifter, and these two operations are conventionally performed by two independent levers.

It is desirable to reduce the weight of the bicycle and to simplify its control, and it is the object of the invention to accomplish this by elimination of one of the two levers usually used, thus providing single lever operation to control both the gear shift and the double or triple plate, and this is accomplished by a new mechanism according to the invention.

DESCRIPTION OF THE INVENTION

In the basic form of the invention a shaft is provided which is rigidly attached to the frame of the bicycle and on this shaft there are mounted in spaced relation for separate, limited rotary movement two disks to each of which there is connected a cable, one cable leading to the gear shift and the other to the central shift. A single lever is mounted on the shaft between the two disks and may be moved sideways into locking engagement with either of the disks after which it may be rotated about the shaft to operate the engaged disk and its connected cable, thereby effecting operation of either the gear shift or the central shifter.

Figure 1:
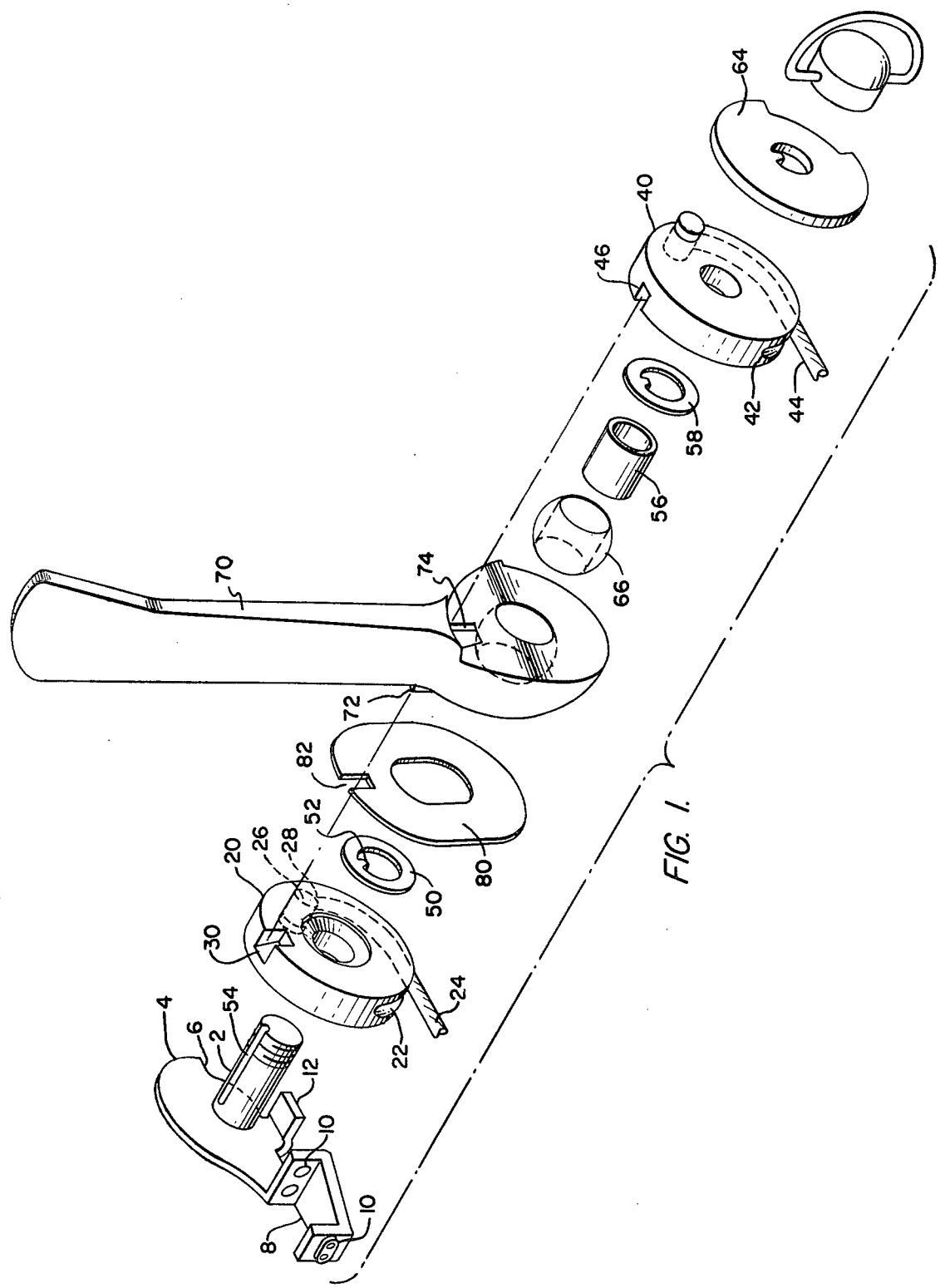
FIG. 1 is an exploded perspective view of the parts comprising a first embodiment of the invention.
Figure 5A:
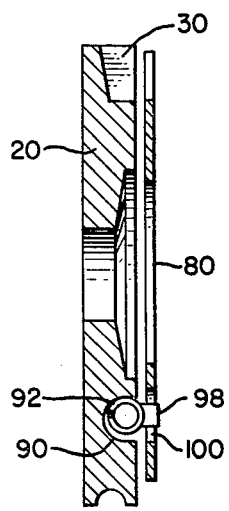
FIGS. 5a and 5b are, respectively, a diametric section and a plan view of the cable-carrying disk of the gear shift according to the embodiment of FIG. 4.
Figure 5B:
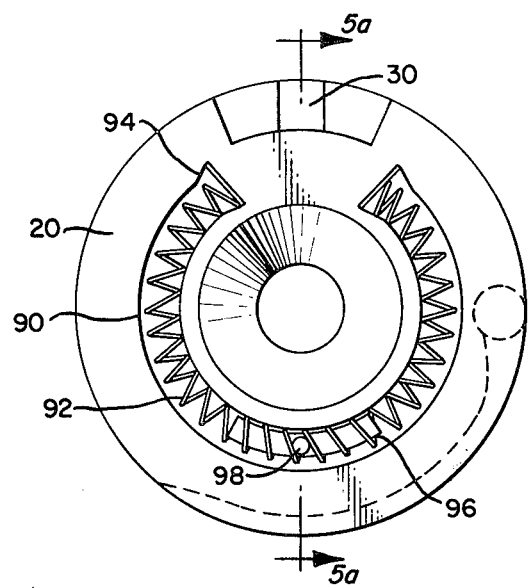
Figure 6:
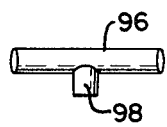
FIG. 6 shows a detail of the hook that connects the spring of FIGS. 5a and 5b with the lever return spring.
Figure 7A:
FIGS. 7a and 7b are, respectively, a diametric section and a plan view of the lever return spring of FIG. 4.
Figure 7B:
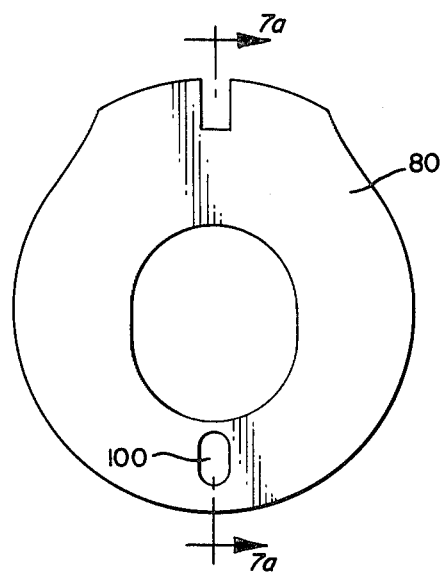
Figure 8:
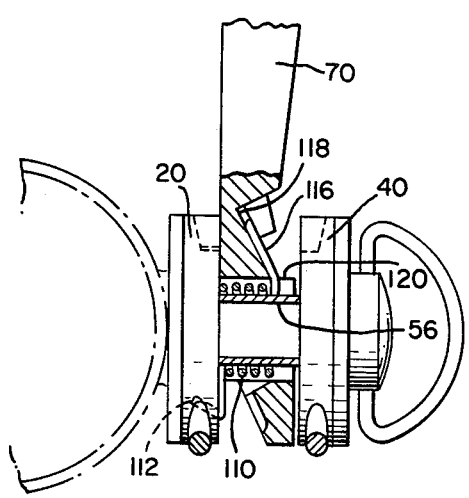
FIG. 8 is a view similar to FIG. 2 showing another embodiment of the invention.
Figure 9A:
FIGS. 9a and 9b are, respectively, diametric and plan views of the gear shifting disk shown in FIG. 8.
Figure 9B:
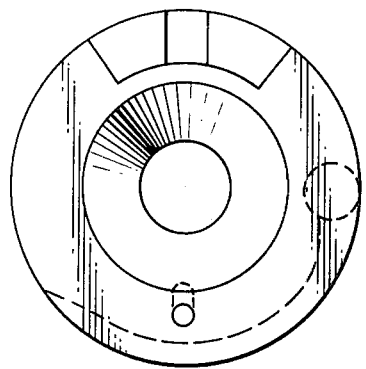
Figure 10A:
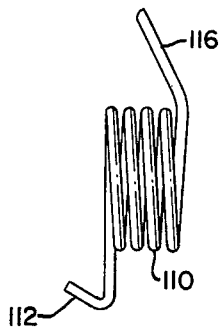
FIGS. 10a and 10b are, respectively, a side and front views of the spring which forms part of the embodiment shown in FIG. 8.
Figure 10B:
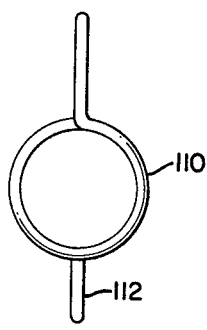

This basic embodiment of the invention is disclosed in FIGS. 1, 2 and 3 and comprises a shaft 2 which at one of its ends is connected to a base plate 4 the periphery of which has a notch 6 that takes in about a fourth of its periphery, the plate also having a U-shaped bracket 8 having two pairs of aligned openings 10 that act as guides for the exit of the cables, and has another enlarged part 10 which acts as a stop for the operating lever.

On the shaft 2 and adjacent the base plate 4 there is rotatably mounted a cable-carrying disk 20 which operates the gear shift, and which has a peripheral groove 22 the length of which is somewhat greater than the angle of rotation of the operating lever and which constitutes a housing groove for cable 24 which has a head 26 which fits into a recess 28 provided in the periphery of the disk at the end of the groove 22 and by which the cable is connected to the disk. The cable-carrying disk 20 also has on the interior side of its periphery a narrow recess 30 which is positioned and shaped to receive a tooth which is mounted on the corresponding face of the operating lever when meshing occurs between these elements.

Also mounted on the shaft 2 and spaced from disk 20 and adjacent the free end of the shaft is a second disk 40 which is intended to operate the central shift, and which has a peripheral groove 42 the length of which is somewhat greater than the angle of rotation of the operating lever and which constitutes a housing for cable 44 which is connected to the disk in the same manner that cable 24 is connected to disk 20. The disk 40 also has on the interior side of its periphery, facing disk 20, a narrow recess 46 which is positioned and shaped to receive a tooth mounted on the facing surface of the operating lever when meshing occurs between these elements.

Between the two disks 30 and 40 there is an assembly of elements comprising, first, a flat pressure washer 50 which surrounds the shaft and has an interior projection 52 which is received in a longitudinal groove 54 in shaft 2 so that the washer cannot rotate with respect to the shaft during movement of the operating lever. A bushing 56 surrounds the shaft and bears at its one end against the pressure washer 50 and at its other end bears against a similar pressure washer 58 which on its outer surface bears against the inner surface of the cable carrying disk 40. A nut 60 is screwed on the free end of shaft 2 and has a movable half-ring 62 which facilitates manipulation of the nut. The nut bears against the outer surface of a plate 64 which itself bears against the outer surface of disk 40, and it will be seen that when the nut is screwed away from or against the plate 64 the parts between the two plates may be loosened or tightened with respect to each other so that the rotation of the two cable-carrying disks is made easier or more difficult at will.

On the pressure bushing 56 there is mounted a ring 66 having a spherical exterior surface on which there is mounted as a ball-and-socket joint the inner end of an operating lever 70. This lever is positioned between the cable-operating disks 20 and 40 and extends upwardly or outwardly so that it can be grasped and operated by the rider. Two teeth 72, 74 are respectively formed on the opposite sides of the lever and are so positioned and are of such size and shape that each of them can be received within one or the other of the recesses 30, 46 of the cable-carrying disks.

It will be seen that the lever 70 may be moved fore-and-aft in a direction parallel to the parallel planes of the two disks and may also be moved from side to side toward and from the two disks. Thus, the lever may be moved so that one or the other of its side teeth 72, 74 is engaged in the recess in the adjacent disk, after which the lever is moved in a fore-and-aft direction to rotate the engaged disk to operate the cable connected to that disk.

Lever tooth 74, which is positioned to engage in recess 46, and recess 46 itself, can optionally be replaced by multiple teeth so that the tooth would be replaced by the maximum toothed surface made possible by the size of the lever, while the recess would be replaced by a toothed sector with a circular crown, somewhat more than 180° in amplitude, the toothed surface of the lever also forming a circular crown sector.

As the gear shift is used most often it is desirable that lever 70 always occupy an operative position at disk 20, and there is therefore provided a circular dished washer 80 which has a central orifice with a diameter greater than that of the ball-and-socket joint, and which is placed between operating lever 70 and disk 20, said washer spring having a notch 82 in its periphery which receives the root of tooth 72, so that when the operating lever is moved into operating engagement with central shifter disk 40 there is produced a bending of washer spring 80 that establishes an elastic recovery force that tends to return the lever to the position shown in FIG. 2 when the lever is released.

It will therefore be understood that by a single lever 70 operation of the gear shift and central shift can be performed independently, and that the lever tends to occupy always the contact position corresponding to the gear shift, as that is used more often. However, the proximity of the lever to the gear shift disk 20 does not presuppose that these elements are always meshed, since after having made the shift on the cable-carrying disk 40 of the central shifter the lever will reach disk 20 with its tooth 72 occupying a position governed by the shift made previously. This position in most cases will not coincide with notch 30 in disk 20 for meshing of said disk with the lever. The invention therefore provides an embodiment equipped with an automatic meshing device so that when the lever is released, once the shift on disk 40 has been made, the lever not only swings toward disk 20 under the influence of washer 80 but is also rotated so that its tooth 72 moves into notch 30 of that disk.

This embodiment is shown in FIGS. 4 to 7 and in it the general structure of all the component parts of the device as described above are retained, with the exception of gear shift disk 20, on which is formed in its inside face a circular recess 90 which extends through approximately 300° and is symmetrical with respect to the diameter going through the meshing recess 30. Within the groove there is housed a spring 92 that is secured within the recess at its end by means of enlargement of the spring within enlargements of the recess as shown at 94. At the central area of spring 92 there is located a hook 96 which is curved to correspond to the curve of groove 90 and which has a central projection 98 which protrudes through the spring toward spring washer 80, which is identical to the one described in the previous embodiment but further incorporates an orifice 100 which receives projection 98 of hook 96. It will be seen that spring washer 80 constantly urges lever 70 toward its position of meshing with disk 20 and that spring 92 simultaneously urges lever 70, through projection 98 and spring washer 80, to a position in which tooth 72 is within notch 30 of the cable-carrying gear shift disk 20. In this way, once the shift on the cable-carrying disk 40 of the central shifter has been performed and the lever 70 is released, it is automatically meshed with cable-carrying disk 20 of the gear shift.

Figure 11:
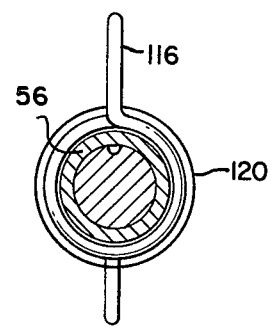
FIG. 11 is a front view of the spring of the previous figure with its lever.

The invention provides another embodiment which also provides automatic meshing and which is shown in FIGS. 8 to 11. This mechanism retains all of the parts of the embodiment of FIGS. 1, 2 and 3 except the ring with its spherical surface 66 and the curved spring washer 80. There is substituted for these elements a spiral spring 110 which surrounds the pressure bushing 56 and has at one of its ends a bend or hook 112 which extends through in an orifice 114 in the cable-carrying disk 20 which operates the gear shift, while on its other end it has another bend 116 which is received in a groove 118 provided in the face of the operating lever 70 opposite disk 20. With spring 110 mounted on pressure bushing 56 movement of the operating lever toward the cable-carrying disk 40 which operates the central shifter causes a deformation of said spring in an axial direction, which causes movement of the lever to the position shown in FIG. 2 when said lever is released, while rotation of lever to operate one of the disks causes a twist of spring 110 in one or other direction because the spring is fastened by its end 112 to disk 20 so that, as in the above case, when the lever is released it always occupies a stable position in which its locking tooth 72 is locked in notch 30 of disk 20. As shown in FIG. 11 spring 110 is covered by a flexible sleeve 120 which is equipped with a longitudinal opening through which extends the bent end of the spring which is connected to the operating lever through groove 118 of the latter. Since the rotating movements of the operating lever 70 cause the coils of the spring to be subjected to a deformation that will reduce its diameter in one direction of lever movement and increase it in the other, the diameter of the spring in rest position will be slightly greater than the outside diameter of pressure bushing 56 while the outside diameter of said spring will in turn be slightly less than the inside diameter of the flexible sleeve that encloses it.

Also, in this last embodiment, and since the spherical ring acting as a ball-and-socket joint has been eliminated, being replaced by flexible sleeve 120, the spherical configuration of the operating lever will also be replaced by a bi-cylindrical configuration. As can be seen clearly in FIG. 8 the shaft is cut in the center of maximum thickness by the part of the lever between the cable-carrying disks.

From the foregoing description it will be understood that the cyclist can perform gear shifting and plate shifting immediately, one after the other, without the need of releasing the lever, thus avoiding the change of position of his hands or the inconvenient procedure of going from one of them through the frame to operate the opposite lever, as is necessary with standard systems. This ease in handling results in a considerable reduction of time in the shifting operations, an advantage that can be decisive in the critical moment of a competition.

I claim:

1. Mechanisms for operating the gear shift and central shifter of a multi-speed bicycle, comprising a shaft fixed to the frame of the bicycle, a ring surrounding the shaft and having a convex spherical external surface, two spaced, parallel disks mounted on the shaft at the ends of the ring for limited rotational movement about the shaft, a cable connected to each disk and being respectively operatively connected to the gear shift and central shifter, each of the facing surfaces of the disks having therein at its periphery a notch, a lever having an inner end with a concave spherical surface mounted on the spherical surface of the ring for limited rotational movement about the shaft and for sideways rocking movement toward and away from each disk, and a tooth on each side of the lever positioned to be received in the notch in each of the disks.

2. Mechanism according to claim 1, comprising in addition means for constantly urging the lever toward and into tooth engagement with the disk to which is connected the cable which is operatively connected to the gear shift.

3. Mechanism according to claim 2, in which the constantly urging means is a dished washer which surrounds the shaft and bears on the lever.

4. Mechanism according to claim 2, in which the constantly urging means is a helical spring which surrounds the shaft and has its end connected to the disk to which is connected the cable which is operatively connected to the gear shift and its other end bearing against the opposite side of the lever.

5. Mechanism according to claim 1, comprising in addition means constantly urging the lever, in its limited rotational movement about the shaft, to a position in which a tooth on the lever is aligned with the notch in the disk which is operatively connected to the gear shift.

* * * * *